United States Patent
Dispensa

(10) Patent No.: US 9,762,576 B2
(45) Date of Patent: Sep. 12, 2017

(54) ENHANCED MULTI FACTOR AUTHENTICATION

(75) Inventor: Steve Dispensa, Leawood, KS (US)

(73) Assignee: Phonefactor, Inc., Overland, KS (US)

( * ) Notice: Subject to any disclaimer, the term of this patent is extended or adjusted under 35 U.S.C. 154(b) by 683 days.

(21) Appl. No.: 12/394,016

(22) Filed: Feb. 26, 2009

(65) Prior Publication Data

US 2009/0300745 A1 Dec. 3, 2009
US 2012/0017268 A9 Jan. 19, 2012

Related U.S. Application Data

(63) Continuation-in-part of application No. 11/862,173, filed on Sep. 26, 2007.

(60) Provisional application No. 61/031,768, filed on Feb. 27, 2008, provisional application No. 60/866,068, filed on Nov. 16, 2006, provisional application No. 60/939,091, filed on May 21, 2007.

(51) Int. Cl.
*H04L 29/06* (2006.01)

(52) U.S. Cl.
CPC ........ *H04L 63/0869* (2013.01); *H04L 63/166* (2013.01); *H04L 63/18* (2013.01); *H04L 63/168* (2013.01)

(58) Field of Classification Search
CPC ... H04L 63/0869; H04L 63/166; H04L 63/18; H04L 63/168
USPC ................... 726/2, 3, 4, 5, 7; 709/225, 226; 713/155, 182, 183; 705/64, 72, 76
See application file for complete search history.

(56) References Cited

U.S. PATENT DOCUMENTS

| 4,679,236 A | 7/1987 | Davies |
| 5,153,918 A | 10/1992 | Tuai |
| 5,615,110 A | 3/1997 | Wong |
| 5,617,470 A | 4/1997 | DePasquale |
| 5,668,876 A | 9/1997 | Falk et al. |

(Continued)

FOREIGN PATENT DOCUMENTS

| FR | 2769446 | 4/1999 |
| WO | 95/19593 | 7/1995 |

(Continued)

OTHER PUBLICATIONS

Shaw; Voice Verification—Authenticating Remote Users Over the Telephone; Network Security; Aug. 1977.

(Continued)

*Primary Examiner* — Sarah Su
(74) *Attorney, Agent, or Firm* — Workman Nydegger

(57) ABSTRACT

In one embodiment, a network element comprises one or more processors, and a memory module communicatively coupled to the processor. The memory module comprises logic instructions which, when executed by the processor, configure the processor to receive, via a first communication channel, a primary authentication request transmitted from a user from a first device, process the primary authentication request to determine whether the user is authorized to access one or more resources, in response to a determination that the user is authorized to access one or more resources, initiate, a secondary authentication request, and transmit the secondary authentication request from the network element to the user via a second communication channel, different from the first communication channel.

22 Claims, 11 Drawing Sheets

(56) References Cited

U.S. PATENT DOCUMENTS

| | | | |
|---|---|---|---|
| 5,841,871 A | 11/1998 | Pinkas | |
| 5,878,143 A | 3/1999 | Moore | |
| 5,949,875 A | 9/1999 | Walker et al. | |
| 5,986,565 A | 11/1999 | Isaka | |
| 6,012,144 A | 1/2000 | Pickett | |
| 6,016,476 A | 1/2000 | Maes et al. | |
| 6,047,270 A | 4/2000 | Joao et al. | |
| 6,049,712 A | 4/2000 | Wallinder | |
| 6,055,638 A | 4/2000 | Pascal et al. | |
| 6,097,800 A | 8/2000 | McLellan | |
| 6,157,705 A | 12/2000 | Perrone | |
| 6,226,752 B1* | 5/2001 | Gupta | G06F 21/33 726/9 |
| 6,249,865 B1 | 6/2001 | Walker et al. | |
| 6,298,120 B1 | 10/2001 | Civanlar et al. | |
| 6,310,538 B1 | 10/2001 | Boucher | |
| 6,430,407 B1 | 8/2002 | Turtiainen | |
| 6,731,731 B1* | 5/2004 | Ueshima | 379/196 |
| 6,741,851 B1* | 5/2004 | Lee et al. | 455/410 |
| 6,741,872 B1 | 5/2004 | Pinault | |
| 6,754,641 B2 | 6/2004 | Kolls | |
| 6,868,391 B1 | 3/2005 | Hultgren | |
| 6,891,819 B1 | 5/2005 | Inoue et al. | |
| 6,934,858 B2 | 8/2005 | Woodhill | |
| 6,943,682 B1 | 9/2005 | Dowens et al. | |
| 7,142,840 B1 | 11/2006 | Geddes et al. | |
| 7,383,572 B2 | 6/2008 | Rolfe | |
| 7,461,258 B2 | 12/2008 | Rolfe | |
| 7,484,102 B2* | 1/2009 | Ingerman et al. | 713/182 |
| 7,574,733 B2 | 8/2009 | Woodhill | |
| 7,720,981 B2 | 5/2010 | Nomura et al. | |
| 7,870,599 B2 | 1/2011 | Pemmaraju | |
| 8,014,756 B1 | 9/2011 | Henderson | |
| 8,191,161 B2 | 5/2012 | Sanchez et al. | |
| 2002/0059148 A1 | 5/2002 | Rosenhaft et al. | |
| 2002/0083012 A1* | 6/2002 | Bush et al. | 705/76 |
| 2002/0138635 A1 | 9/2002 | Redlich et al. | |
| 2003/0061066 A1 | 3/2003 | Ochiai | |
| 2003/0061350 A1 | 3/2003 | Masuoka et al. | |
| 2003/0074580 A1* | 4/2003 | Knouse | H04L 63/0815 726/4 |
| 2003/0115203 A1 | 6/2003 | Brown et al. | |
| 2003/0140230 A1* | 7/2003 | de Jong et al. | 713/182 |
| 2004/0010698 A1 | 1/2004 | Rolfe | |
| 2004/0044911 A1 | 3/2004 | Takada et al. | |
| 2004/0078571 A1 | 4/2004 | Haverinen | |
| 2004/0122685 A1* | 6/2004 | Bunce | 705/1 |
| 2004/0187024 A1* | 9/2004 | Briscoe | H04L 63/08 726/29 |
| 2004/0243832 A1 | 12/2004 | Wilf et al. | |
| 2004/0248555 A1 | 12/2004 | Herrmann et al. | |
| 2005/0108520 A1* | 5/2005 | Yamamoto et al. | 713/155 |
| 2005/0268107 A1* | 12/2005 | Harris et al. | 713/182 |
| 2006/0004656 A1* | 1/2006 | Lee | 705/39 |
| 2006/0015743 A1 | 1/2006 | Camaisa et al. | |
| 2006/0069921 A1* | 3/2006 | Camaisa et al. | 713/182 |
| 2006/0095788 A1 | 5/2006 | Bronstein et al. | |
| 2006/0179304 A1* | 8/2006 | Han | 713/168 |
| 2006/0190346 A1* | 8/2006 | Sines et al. | 705/26 |
| 2006/0190980 A1 | 8/2006 | Kikkoji et al. | |
| 2006/0204051 A1 | 9/2006 | Holland, IV | |
| 2006/0294387 A1* | 12/2006 | McCracken et al. | 713/182 |
| 2007/0016796 A1* | 1/2007 | Singhal | 713/183 |
| 2007/0027807 A1* | 2/2007 | Bronstein | 705/44 |
| 2007/0050840 A1* | 3/2007 | Grandcolas et al. | 726/5 |
| 2007/0079135 A1* | 4/2007 | Saito | 713/183 |
| 2007/0079136 A1 | 4/2007 | Vishik et al. | |
| 2007/0107050 A1 | 5/2007 | Selvarajan | |
| 2007/0110282 A1* | 5/2007 | Millsapp | 382/115 |
| 2007/0136573 A1 | 6/2007 | Steinberg | |
| 2007/0150946 A1 | 6/2007 | Hanberger et al. | |
| 2007/0157298 A1* | 7/2007 | Dingwall et al. | 726/8 |
| 2007/0180042 A1* | 8/2007 | Benco et al. | 709/207 |
| 2007/0199053 A1 | 8/2007 | Sandhu et al. | |
| 2007/0203850 A1 | 8/2007 | Singh et al. | |
| 2077/0182714 | 8/2007 | Pemmaraju | |
| 2007/0233615 A1* | 10/2007 | Tumminaro | 705/75 |
| 2007/0238453 A1* | 10/2007 | Chang | H04L 12/587 455/421 |
| 2007/0250632 A1 | 10/2007 | Nomura et al. | |
| 2007/0250914 A1* | 10/2007 | Fazal et al. | 726/5 |
| 2007/0255943 A1* | 11/2007 | Kern et al. | 713/155 |
| 2007/0262134 A1* | 11/2007 | Humphrey et al. | 235/379 |
| 2007/0262857 A1* | 11/2007 | Jackson | 340/506 |
| 2008/0010674 A1* | 1/2008 | Lee | 726/7 |
| 2008/0086767 A1 | 4/2008 | Kulkarni et al. | |
| 2008/0098464 A1* | 4/2008 | Mizrah | G06F 21/36 726/5 |
| 2008/0115198 A1 | 5/2008 | Hsu et al. | |
| 2008/0120711 A1 | 5/2008 | Dispensa | |
| 2009/0013388 A1* | 1/2009 | Holvey et al. | 726/5 |
| 2009/0235346 A1 | 9/2009 | Steinberg | |
| 2009/0271306 A1* | 10/2009 | Pierson | 705/35 |
| 2009/0300745 A1 | 12/2009 | Dispensa | |
| 2009/0302997 A1 | 12/2009 | Bronstein | |
| 2009/0304162 A1* | 12/2009 | Fujii et al. | 379/93.02 |
| 2009/0313681 A1* | 12/2009 | Kim et al. | 726/4 |
| 2010/0070759 A1* | 3/2010 | Leon Cobos et al. | 713/155 |
| 2010/0235276 A1 | 9/2010 | Smith | |
| 2010/0239093 A1* | 9/2010 | Hotta | 380/270 |
| 2010/0250410 A1* | 9/2010 | Song et al. | 705/30 |
| 2011/0041163 A1* | 2/2011 | Babi et al. | 726/4 |
| 2012/0017268 A9 | 1/2012 | Dispensa | |
| 2012/0221437 A1 | 8/2012 | Yoo | |
| 2012/0274444 A1 | 11/2012 | Micali et al. | |
| 2012/0295580 A1 | 11/2012 | Corner | |
| 2012/0311322 A1* | 12/2012 | Koyun et al. | 713/156 |
| 2013/0347129 A1 | 12/2013 | Samuelsson et al. | |

FOREIGN PATENT DOCUMENTS

| | | | |
|---|---|---|---|
| WO | 99/03070 | 1/1999 | |
| WO | 99/62037 | 12/1999 | |
| WO | WO/99/62222 | 12/1999 | |
| WO | WO 2005009018 A1 * | 1/2005 | H04M 7/00 |

OTHER PUBLICATIONS

Hume et al.; Credit authorization by telephone; 1985; Butterworth & Co (Publishers) Ltd.

Asokan et al; Research Report: Electronic Payment Systems; 1996; IBM Research Division (Switzerland).

"Final Office Action Issued in U.S. Appl. No. 13/751,420", Mailed Date: Aug. 5, 2015, 18 Pages.

"Non Final Office Action received for U.S. Appl. No. 13/751,420", Mailed Date: Feb. 12, 2015, 16 Pages.

Office Action dated Oct. 22, 2013 cited in U.S. Appl. No. 13/751,420

Office Action dated Jul. 8, 2014 cited in U.S. Appl. No. 13/751,420.

Office Action dated Aug. 5, 2015 cited in U.S. Appl. No. 13/751,420.

* cited by examiner

1100

| Username | Password | Approved Resource | Contact | Authentication Code |
|---|---|---|---|---|
| Bsmith | 001101 | Email Server | 212-555-5555 | 5241 |
| Bsmith | Alpha | FTP Server | 408-215-9870 | Mark41 |
| Cwagner | M694U | Sales Database | 303-214-4928 | 5908 |
| Smarshall | 6839 | Internet Site | 563-503-4385 | djkwn |
| Tveit | 460MIN | Sales Database | 816-454-4392 | jn340 |

Fig. 11

ENHANCED MULTI FACTOR AUTHENTICATION

RELATED APPLICATIONS

This application claims the priority benefit, with regard to all common subject matter, of U.S. Provisional Application No. 61/031,768, filed on Feb. 27, 2008, entitled ENHANCED MULTI FACTOR AUTHENTICATION, and is further a continuation-in-part claiming priority benefit, with regard to all common subject matter, of U.S. patent application Ser. No. 11/862,173, filed on Sep. 26, 2007 and which issued as U.S. Pat. No. 8,365,258 on Jan. 29, 2013, which claims the priority benefit, with regard to all common subject matter, of U.S. Provisional Application No. 60/939,091, filed on May 21, 2007, and U.S. Provisional Application No. 60/866,068, filed Nov. 16, 2006.

BACKGROUND

Internet access has become ubiquitous. In addition to traditional dial-up and Local Area Network-based network access, wireless access technologies including IEEE 802.11b and 802.11g (WiFi), WiMax, Bluetooth™, and others are being widely deployed. Many public locations, such as airports, bookstores, coffee shops, hotels, and restaurants have free or fee-based access to wireless Internet service. Some locations, such as hotel rooms, also offer internet access via Ethernet ports. In addition, businesses offer visiting professionals access to Internet service while they are on the premises.

Such Internet access services typically are not secured at the datalink layer. It is often possible for network administrators, other users, or even criminals to capture and view network transmissions made on these networks. The "last mile", or the few hops on the network that are closest to the end user, are often only lightly secured, if at all, and are particularly vulnerable to traffic snooping. Enhanced communication security would find utility.

In addition, authentication remains a persistent technical problem in the information technology industry. With the proliferation of untrusted applications and untrusted networks, and the increasing use of the Internet for business functions, the authentication issues have become prominent. Authentication refers to a process by which a user makes his or her identity known to a system or application which the user is attempting to access, and occasionally, also the process by which the user verifies the identity of the system being accessed. A common authentication technique involves the use of a shared username and password combination. This style of authentication is vulnerable to a number of weaknesses. For example, passwords must be made long enough to be secure while being short enough to be memorable. Additionally, the loss of the password is sufficient to allow an attacker to gain access to the system by impersonating the user. Therefore, additional authentication techniques would find utility.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 11 is a schematic illustration of and embodiment of a data file which may be used in a multifactor authentication.

DETAILED DESCRIPTION

Described herein are exemplary systems and methods for secure network computing and multifactor authentication. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
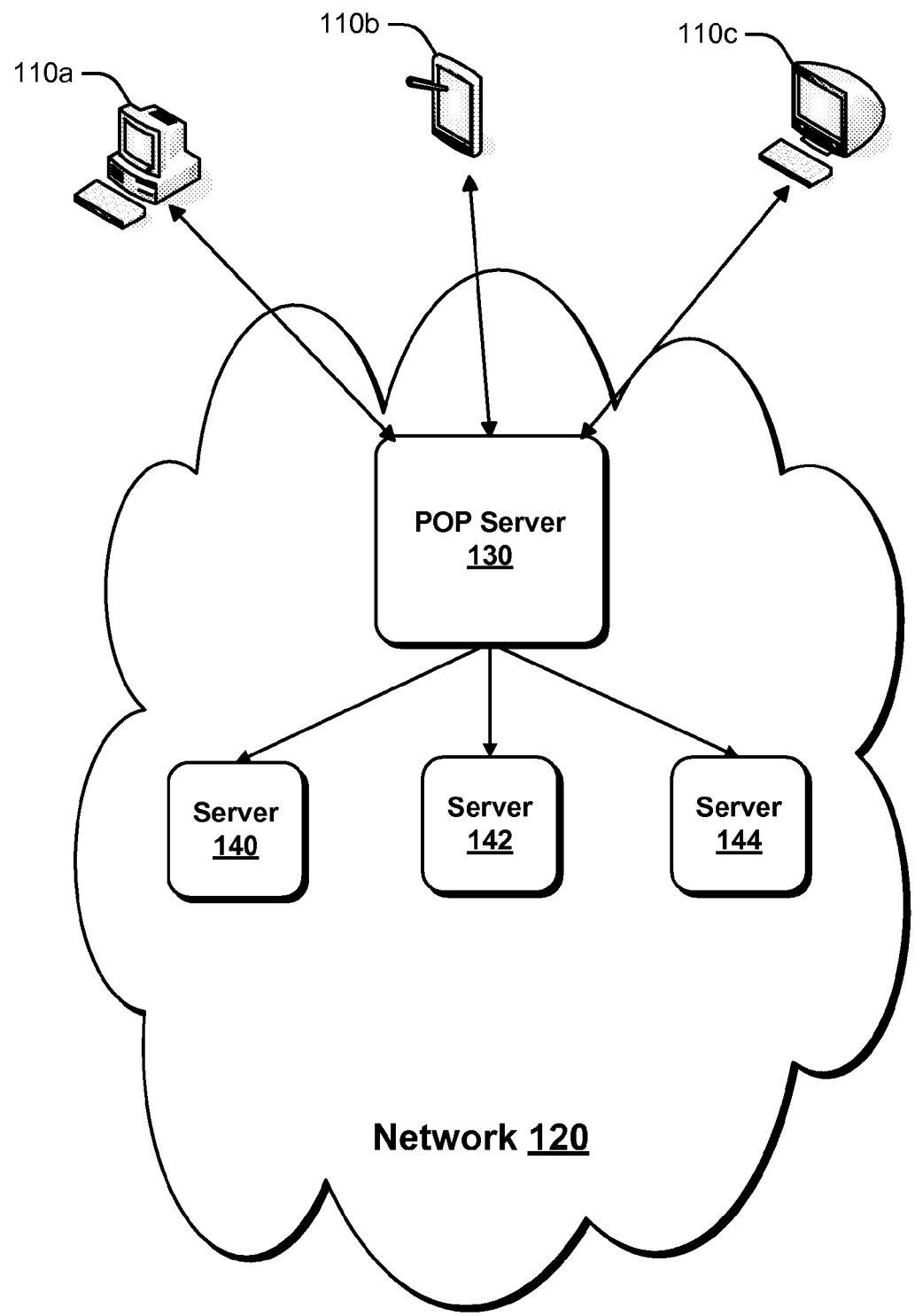
FIG. 1 is a schematic illustration of a networked computing environment in accordance with an embodiment.

FIG. 1 is a schematic illustration of a networked computing environment in accordance with an embodiment. In the exemplary architecture depicted in FIG. 1, one or more client computing devices 110a, 110b, 110c establish a communication connection with a point of presence (POP) server 130, which in turn communicates with one or more target servers 140, 142, 144 via a network 120. Target servers 140, 142, 144, in turn, provide access to one or more computing resources such, as, e.g., internet services, electronic mail services, data transfer services, and the like.

Client computing devices 110a, 110b, 110c may be any computer-based communication device, including a personal computer 110a, a personal digital assistant (PDA) 110b, or a terminal device 110c. Client computing devices 110a, 110b, 110c establish a communication with POP server 130 via a communication network, which may be the same network 120 or a separate communication network. The particular form of communication network is not important. Communication network may comprise one or more direct communication links (e.g., a dial-up connection) between respective remote access devices 110a, 110b, 110c. Alternatively, the communication network may comprise a private data network such as, e.g., an X.25 network, a local area network (LAN), a wide area network (WAN), or a public network such as, e.g., the Internet.

Figure 2:
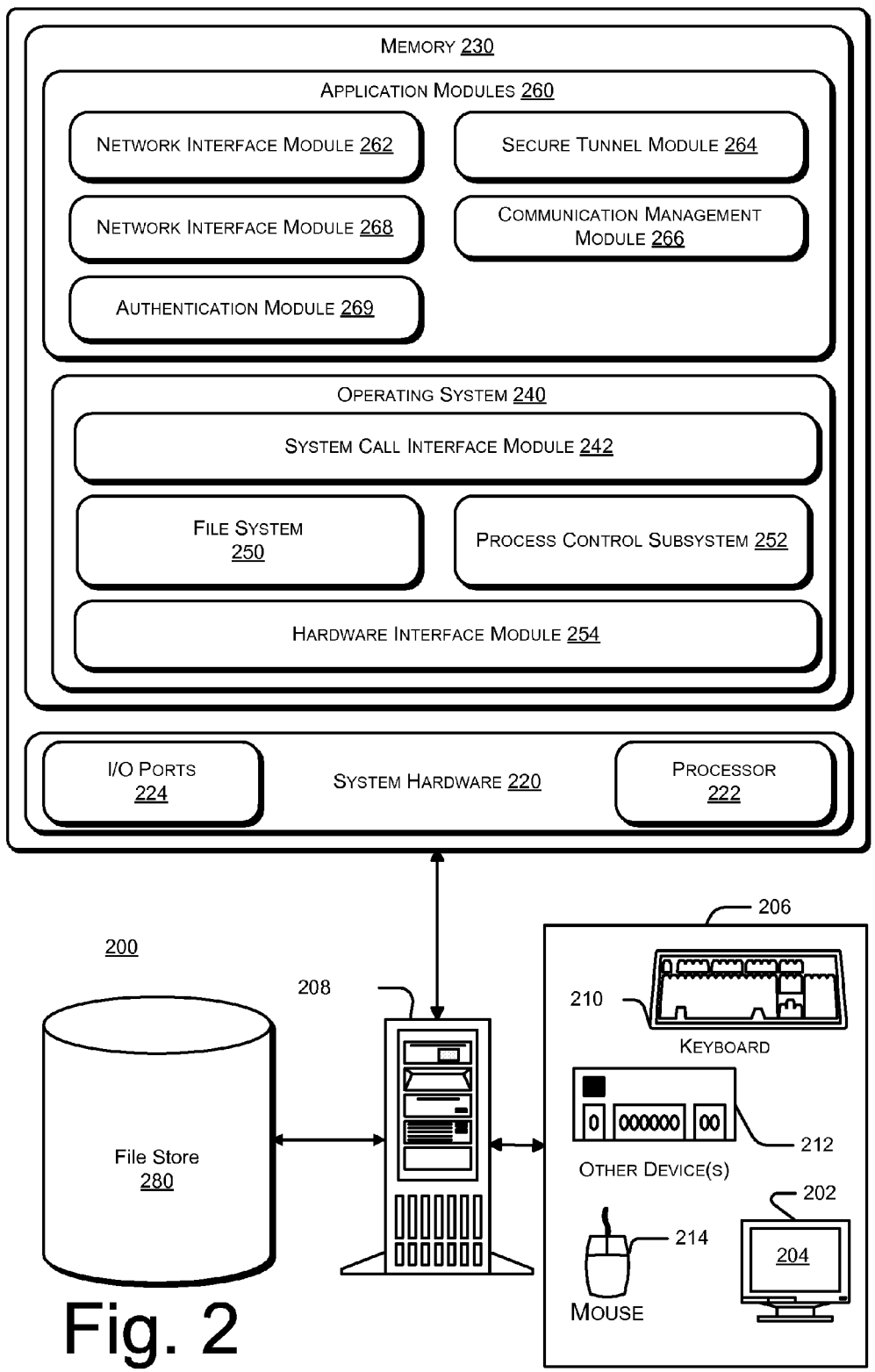
FIG. 2 is a schematic illustration of a server in accordance with an embodiment.

In one embodiment, POP server 130 may be implemented by a general purpose computing device such as, e.g., a server, that executes logic instructions which cause the processor to execute various methods for performing secure network computing. FIG. 2 is a schematic illustration of an exemplary computer system 200 adapted to perform secure network computing. The computer system 200 includes a computer 208 and one or more accompanying input/output devices 206 including a display 202 having a screen 204, a keyboard 210, other I/O device(s) 212, and a mouse 214.

The other device(s) 212 can include a touch screen, a voice-activated input device, a track ball, and any other device that allows the system 200 to receive input from a developer and/or a user. The computer 208 includes system hardware 220 and random access memory and/or read-only memory 230. A file store 280 is communicatively connected to computer 208. System hardware 220 includes a processor 222 and one or more input/output (I/O) ports 224. File store 280 may be internal such as, e.g., one or more hard drives, or external such as, e.g., one or more external hard drives, network attached storage, or a separate storage network.

Memory 230 includes an operating system 240 for managing operations of computer 208. In one embodiment, operating system 240 includes a hardware interface module 254 that provides an interface to system hardware 220. In addition, operating system 240 includes one or more file systems 250 that managed files used in the operation of computer 208 and a process control subsystem 252 that manages processes executing on computer 208. Operating system 240 further includes a system call interface module 242 that provides an interface between the operating system 240 and one or more application modules 262 and/or libraries 264.

In operation, one or more application modules 260 executing on computer 208 make calls to the system call interface module 242 to execute one or more commands on the computer's processor. The system call interface module 242 invokes the services of the file systems 250 to manage the files required by the command(s) and the process control subsystem 252 to manage the process required by the command(s). The file system 250 and the process control subsystem 252, in turn, invoke the services of the hardware interface module 254 to interface with the system hardware 220.

The particular embodiment of operating system 240 is not critical to the subject matter described herein. Operating system 240 may be embodied as a UNIX operating system or any derivative thereof (e.g., Linux, Solaris, etc.) or as a Windows® brand operating system.

In one embodiment, memory 230 includes one or more network interface modules 262, 268, one or more secure tunnel modules 264, and one or more communication management modules 266. Network interface modules may be implemented as web browsers such as, e.g., Internet Explorer, Netscape, Mozilla, or the like. Secure tunnel module 264 comprises logic instructions which, when executed by a processor, configure the processor to generate a secure communication tunnel between the POP server 130 and a client computing device such as, e.g., one or more of client computing devices 110a, 110b, 110c. Communication management module 266 comprises logic instructions which, when executed by a process, configure the processor to manage communications between the POP server 130 and one or more client computing devices 110a, 110b, 110c and between the POP server 130 and the one or more servers 140, 142, 144.

In embodiments, POP server 130 receives a service request from a client computing device such as, e.g., one or more of client computing devices 110a, 110b, 110c, identifying one or more resources available on a server such as 140, 142, 144. For example, the service request may be embodied as a Uniform Resource Locator (URL) transmitted to POP server 130 from a browser executing on a client computing device. In response to the service request, POP server 130 establishes a first communication link between the POP server 130 and the one or more resources available via a computing network identified in the service request. In one embodiment, POP server 130 may launch an independent request for the resource request for the resource identified in the service request from the client computing device. POP server 130 may further establish a first, secure communication link between the POP server 130 and the client computing device 110a, 110b, 110c, and connect a network interface module on the client computing device to the secure communication link.

POP server 130 may further manage communication activity between the client computing device and the one or more resources available via a computing network at the POP server. In one embodiment, managing communication activity may include passing information received from a server 140, 142, 144 in response to a resource request from the POP server 130 to a client computing device 110a, 110b, 110c via a secure communication link.

Figure 3:
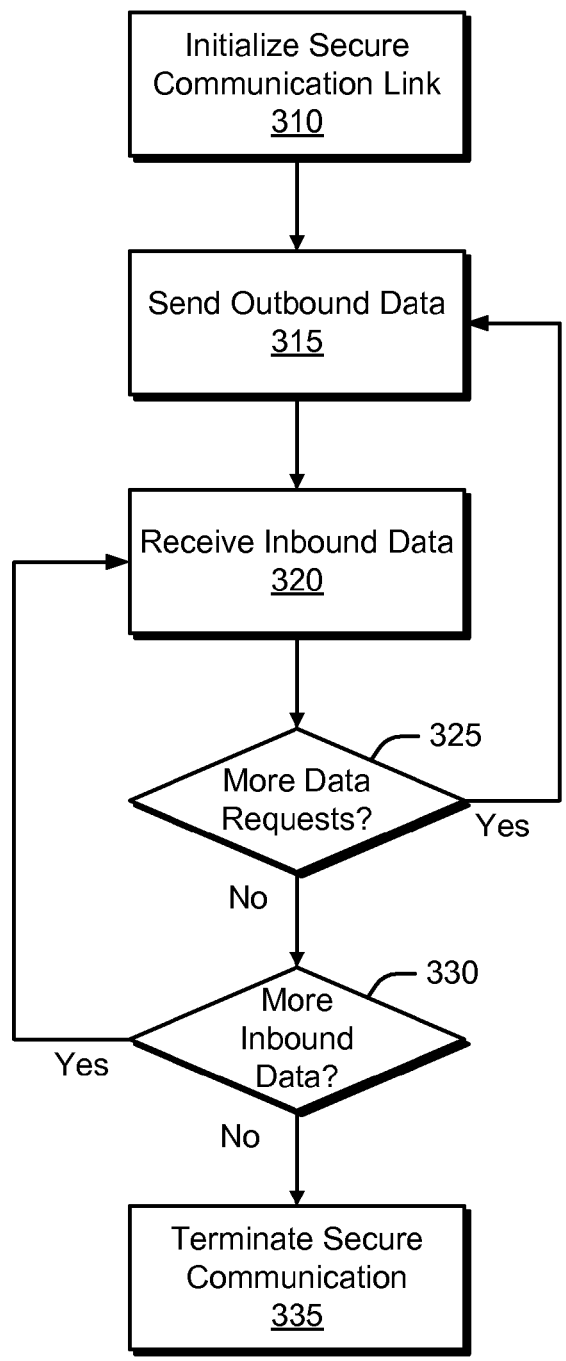
FIGS. 3-8 are flow diagrams of embodiments of methods for secure network computing.

Operations implemented by the various modules 262, 264, 266, 268 and by client computing devices 110a, 110b, 110c are explained with reference to FIGS. 3-8. FIGS. 3-8 are flow diagrams of embodiments of methods for secure network computing. FIG. 3 is a flow diagram illustrating high-level operations executed by a computing device such as one of client computing devices 110a, 110b, 110c in a method for secure network computing. In one embodiment, at operation 310 a secure communication link is initialized between POP server 130 and the client computing device 110a, 110b, 110c. At operation 315 the client computing device sends outbound data via the secure communication link and at operation 320 the client computing device receives inbound data via the secure communication link. If, at operation 325 there are more outbound data requests, then control passes back to operation 315. Similarly, if at operation 330 there is more inbound data control passes back to operation 320 and the inbound data is received. If there are no further data requests or inbound data remaining, then control passes to operation 335 and the secure communication link may be terminated. Operations illustrated in FIG. 3 are explained in greater detail in FIGS. 4-8.

Figure 4:
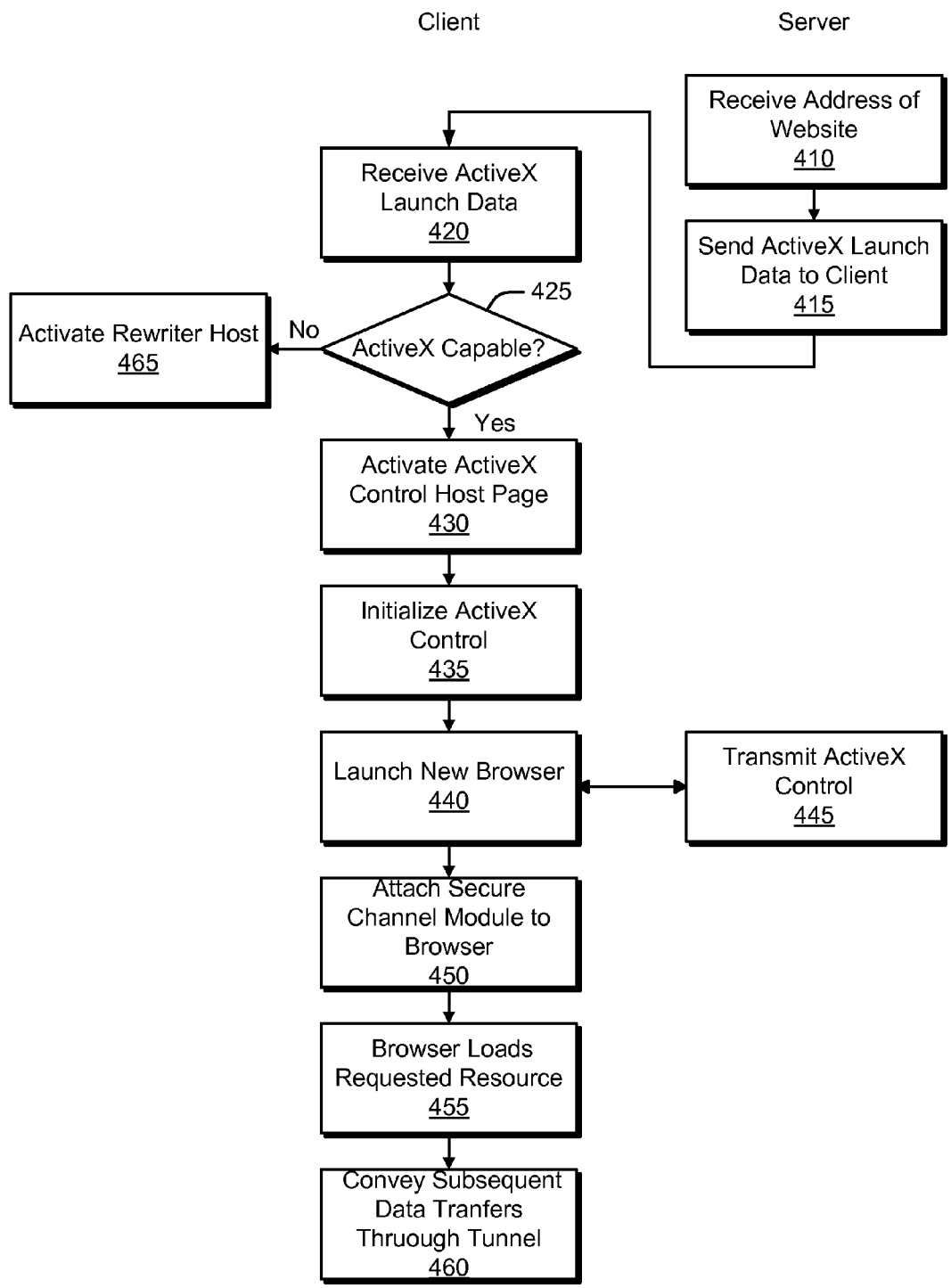

FIG. 4 is a flow diagram illustrating operations in a method for initializing a secure communication link between POP server 130 and a client computing device 110a, 110b, 110c. In one embodiment, POP server 130 implements an application tunneling technology, referred to herein as an AppTunnel, to construct a secure communication tunnel between POP server 130 and a client computing device 110a, 110b, 110c.

Referring to FIG. 4, at operation 410 POP server 130 receives an address of one or more resources such as, e.g., a website or other resource available on network 120. In one embodiment, the address received may represent a URL received in a service request from a web browser executing on client computing device 110a, 110b, 110c. In one embodiment, POP server 130 transmits an Active X control 415 comprising launch data to client computing device 110a, 110b, 110c. In alternative embodiments, the ActiveX control client may be replaced with a plug-in module compatible with other protocols such as, for example, the JAVA architecture or a CORBA architecture.

At operation 420 the client computing device 110a, 110b, 110c receives the ActiveX launch data from server 130. If, at operation 425 the client computing device is not compatible with ActiveX technology, then control passes to operation 465 and a rewriter host module may be activated. This procedure is explained in greater detail below. By contrast, if the client computing device 110a, 110b, 110c is capable of implementing an ActiveX control, then control passes to operation 430 and the client computing device 110a, 110b, 110c, activates an ActiveX control host page. The Active X control host page instructs the browser how to load the ActiveX control, where to retrieve it from (if it is not already locally cached), and with what parameters the control should be started. A similar host page may be used to embed plug-ins into other browsers such as Mozilla, Netscape, etc. This information may be contained in an HTML <OBJECT> tag.

At operation 435 the client computing device 110a, 110b, 110c initiates the ActiveX control received from the server 130. The ActiveX control causes the client computing device 110a, 110b, 110c to launch a new instance of a browser or other network interface software (operation 440). If additional ActiveX controls are necessary to enable the client computing device 110a, 110b, 110c, then one or more additional ActiveX controls maybe transmitted between the server 130 and the client computing device 110a, 110b, 110c.

At operation 450 the client attaches a secure channel module to the browser. In one embodiment, the secure channel module may be embodied as an AppTunnel client module. The AppTunnel secure channel module is described in detail in U.S. patent application Ser. No. 10/737,200, incorporated by reference here above. Portions of that description are excerpted in the following paragraphs.

Application tunneling is a method for transporting data from a user's computer to a third party computer (a "proxy"). In one implementation, Application data may be intercepted as soon as it is sent (i.e., above layer 4 of the OSI model), before it is encapsulated by Internet protocols such as TCP, UDP, or IP. Data may then be transported across the network to the proxy. In other implementations, this application-level data is acquired differently (perhaps, for example, through the use of a virtual adapter). In all cases, it is application-level data (OSI layers 5-7, depending on the application and the protocol) that is tunneled via AppTunnels.

AppTunnels is application tunneling technology that tunnels data from an application on a first computer to a second computer, perhaps over a secure tunnel, for further processing and proxying at that other computer. AppTunnels technology may be implemented in a Static form or in a Dynamic form. Static AppTunnels technology requires manual (or pre-configured) establishment of the application tunnels and listeners. By contrast, dynamic AppTunnels implements on-the-fly tunnel creation using hook mechanisms.

Encryption and/or other security technologies may be applied to the tunnel to add security to the data being transported, although this is not strictly necessary.

AppTunnels differs from existing tunneling technologies such as Generic Routing Encapsulation (GRE) in that it is designed to operate at the end user's computer, in such a way that the end user's applications do not have to be informed about the existence of the tunneling technology. By contrast, tunneling technologies such as GRE, on the other hand, are designed to be implemented in network elements such as routers.

AppTunnels differs from host-based encryption technologies such as SSL in several ways. First, SSL technology must be directly supported by the application in order to be applied. AppTunnels, however, does not require application awareness in order to be applied. Furthermore, SSL is closely tied to a particular security and encryption architecture. AppTunnels may be used with or without security technologies, and imposes no requirements on the underlying security technologies. AppTunnels has been used in conjunction with the WTP security protocol and with SSL.

To intercept the network traffic of an application a local listener is created and a tunnel is established between the first computer and the second computer. In one embodiment, a local listener may be implemented as listening TCP, UDP, or other socket(s) bound to a local host address (e.g., 127.0.0.1) on a computer. The port number, where applicable, may be determined by the tunneled application, and may be arbitrary in some protocols. Local listeners may be created either in response to instructions from dynamic AppTunnels hooks or by static configuration received in advance. It is also possible for a user to manually initiate the creation of a listener (and its associated tunnel). A data tunnel may be created between the AppTunnels client software and a compatible tunnel module on a server. In one embodiment, the tunnel may be implemented in accord with the WTP protocol described in U.S. patent application Ser. No. 10/737,200.

Once an AppTunnel has been initialized, the end user application can be directed to connect to the AppTunnel. The process for this varies per application. In the case of Dynamic AppTunnels, no other action is necessary; data simply starts flowing from the application to the AppTunnels software, which in turn tunnels the data across the connection to the WTP concentrator.

In the case of Static AppTunnels, one additional step is required. The application is tricked into connecting to the local listener instead of to the target server, as would otherwise naturally be the case. To trick the client, the DNS system is configured to return the localhost address (127.0.0.1, usually) to requests for the destination server's IP address. This is usually done by changing the locally-present "hosts" file that the computer's DNS system consults before returning an IP address. This hosts file is modified, with an entry being inserted for the name of the target server with the IP address of localhost. In one embodiment, the AppTunnels client may be implemented as an executable component that is incorporated into and run by the user's web browser such as, e.g., an ActiveX control. For other browsers or other platforms, a Netscape Plugin may be used.

In one embodiment, AppTunnels implements a method of intercepting traffic in order to tunnel it is as follows: First, the computer's DNS resolution system is modified to re-route traffic for target network servers to the local computer. Next, the AppTunnels Client establishes itself as a server on the port that the application would expect to connect to. Once established, applications transparently connect to the Client on the local computer rather than to their natural target-network servers. No configuration or modification of the tunneled application is necessary.

The AppTunnels method can be used to tunnel any user-mode data over a tunnel to the server 130. This includes TCP and UDP on all platforms. Other protocols may be available for tunneling, depending on the platform. The AppTunnels architecture supports complex network protocols such as FTP, RPC, H.323, and other proprietary multi-connection protocols. It provides this support by inspection of protocol data at the server. A protocol may be termed 'complex' if it requires more than a simple client-to-server TCP connection.

In AppTunnels mode, the client computing device 110a, 110b, 110c receives a module called the AppTunnels Client, which attaches to the web browser. The AppTunnels client enables the web browser to access target network web pages by proxying requests through the AppTunnels client. The AppTunnels client forwards the requests to the server 130, which retrieves the requested document and returns it to the AppTunnels client, which in turn returns it to the web browser.

In brief, the client computing device 110a, 110b, 110c first reads the proxy settings configuration from the user's web browser. The client computing device 110a, 110b, 110c stores the proxy settings and configures the browser to use a proxy auto-configuration file. This file instructs the browser to request its new proxy settings from the AppTunnels client. The request is made and replied to, and the new settings cause all further requests for documents to be proxied through the AppTunnels client.

The AppTunnels client then establishes a connection to server 130 and authenticates itself. After authentication, the AppTunnels client establishes itself as a server application and listens for incoming requests from the browser. As requests are received, they are forwarded to server 130. Responses are read in from the server and are sent back to the waiting browser.

The browser is monitored by Dynamic AppTunnels for any network communication attempts. In one embodiment, these attempts may be monitored using function call hooks of the Microsoft Winsock library, but other hooks are possible, as are other monitoring architectures (such as, for example, Winsock Layered Service Providers). When new network traffic is detected, it is intercepted by the Dynamic AppTunnels code for further processing.

In one embodiment, child processes created by the browser may be injected with the Dynamic AppTunnels monitoring code. Thus, network traffic generated by a child processes send will be encapsulated in the AppTunnel. Child process monitoring may be implemented using an API hook for all of the CreateProcess() family of functions. When a call to CreateProcess() is made, the Dynamic AppTunnels code receives it first, and ensures that the monitoring code is injected in the resulting new process.

In one embodiment, dynamic AppTunnels technology is implemented using API hooks. When dynamic AppTunnels receives a request to start a tunneled process, it creates a new process using the CreateProcess() API call. A new process may be created as suspended, so that the process does not run after it is initially created. At this point, one or more imported functions are substituted, or hooked, such that they point to wrapper functions that are part of the Dynamic AppTunnels software. The hooked functions are of two classes: network functions and process management functions.

In particular, the CreateProcess() function (and its relatives) may be hooked so that any child processes that are created can have the Dynamic AppTunnels monitoring code injected as well. This code is responsible for signaling the browser plugin that it should inject the rest of the hooks into the newly created process. Any child processes of that child are treated in the same way.

The networking functions that are hooked are related to connection requests and to name resolution requests. In general, all functions that are called during initial connection setup are intercepted. Once hooked, these functions receive any connection requests, and use this information for two purposes. The first is to coordinate with the tunneling protocol on the AppTunnel server to create an additional AppTunnel between the client and the AppTunnel server, and to create a local listener that is attached to that tunnel. The second is to re-direct the requesting application to the local listening socket, so that connections are made to it instead of to the original target server. This process allows network traffic generated by the client to be captured by the browser plug-in and tunneled.

Alternatively, the plug-in may choose to examine the connection request information and make a decision at runtime as to whether the traffic should be tunneled or allowed to go straight out to the network as it otherwise would have. These decisions can be based on names (such as DNS or WINS names), network addresses, port numbers, or other identifying information. While this description has largely been written in the context of TCP sockets, it should be pointed out that other kinds of network traffic may be supported, including UDP and raw IP packets.

Referring back to FIG. 4, at operation 455 the browser instantiated at the client computing device 110a, 110b, 110c loads the requested resource, which may be displayed on a suitable user interface such as, e.g., a computer screen or the like. At operation 460, subsequent data transfer operations between the client computing device 110a, 110b, 110c and the server 130 are conveyed through the secure tunnel. When the user of the client computing device is finished with the browsing session, the browser may be closed. Closing the browser also closes any dynamic AppTunnels constructed between the client computing device 110a, 110b, 110c and the server 130.

Figure 5:
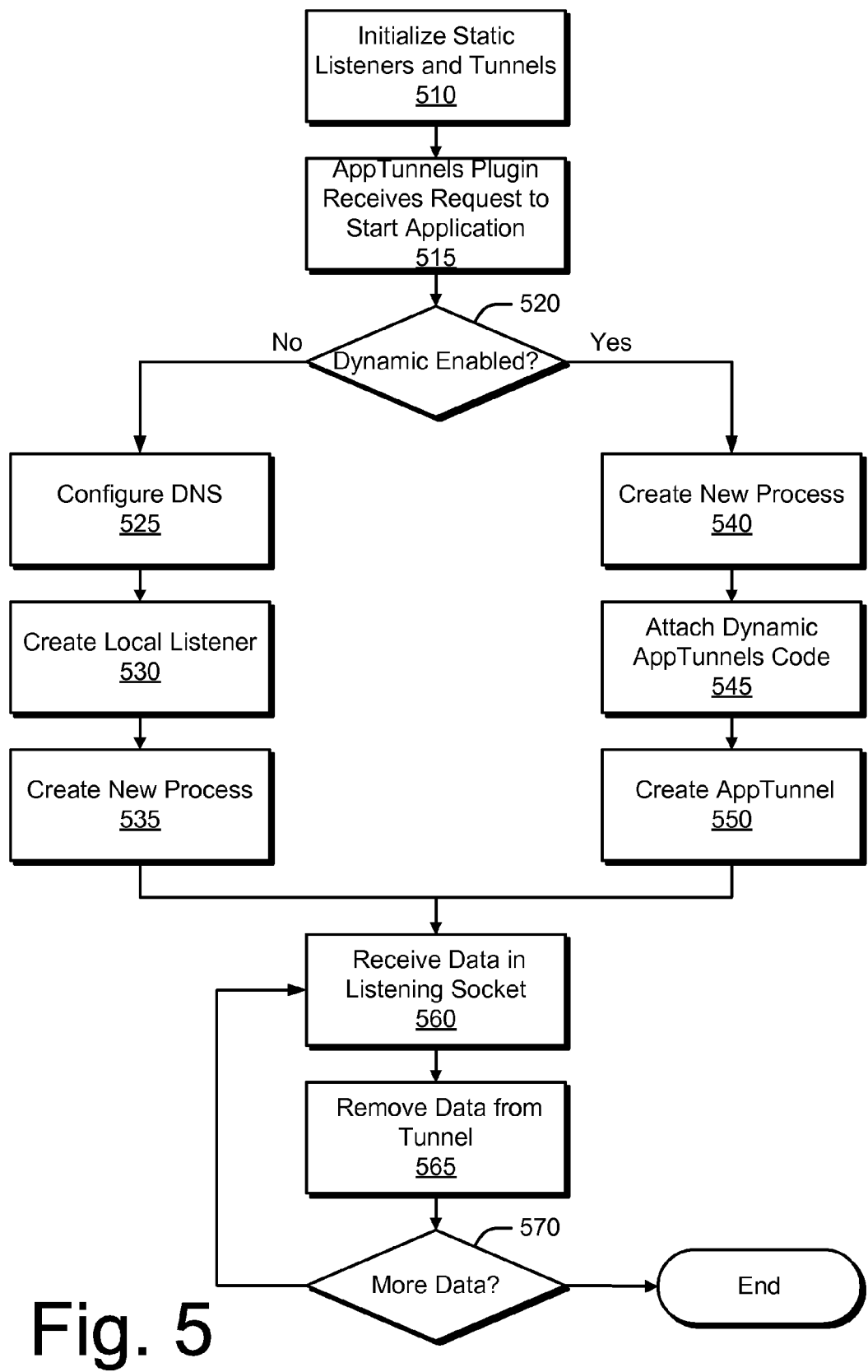

FIG. 5 is a flow diagram illustrating operations in a method for implementing an AppTunnel on a client computing device 110a, 110b, 110c. In one embodiment, the ActiveX control transmitted from the server 130 to the client computing device operations of FIG. 5 may cause the client computing device to perform the operations illustrated in FIG. 5.

Referring to FIG. 5, at operation 510 one or more static listeners and AppTunnels are initialized on the client computing device. At operation 515 the AppTunnels plugin (i.e., the ActiveX control) receives a request to start an application. For example, the plugin may receive a request to start an instance of a browser.

At operation 520 it is determined whether the device supports dynamic AppTunnels. As described above, AppTunnels can operate in either a static mode or in a dynamic mode. The difference is in the way the data is acquired for tunneling. Static AppTunnels uses a static local listening TCP/IP socket for each pre-configured service. If a user wants to use a web browser over a static AppTunnel, for example, there must be a configured application tunnel listening on TCP port 80 on the local host. Furthermore, the destination address for the AppTunnel must be specified. To cause the user's application to connect to the AppTunnels socket instead of trying to use Internet routes in the usual way, the DNS system of the client computing device is configured (usually using the computer's hosts file) to change the IP address of the server in question to point to the local host (usually 127.0.0.1), thereby fooling the application into making a local connection to the listening socket.

Thus, referring to FIG. 5, if at operation 520 dynamic AppTunnels is not enabled, then control passes to operation 525 and the DNS system is configured, and at operation 530 a local listening socket is created. At operation 535 a new process is created.

By contrast, if at operation 520 the device accommodates dynamic AppTunnels, then control passes to operation 540 and a new process is created on the client computing device. In one embodiment creating a new process may involve a user clicking an HTML link on the web page in a browser executing on the client computing device. The ActiveX control then launches the new process and injects the Dynamic AppTunnels application monitoring code into the newly started process (operation 545). At operation 550 a new AppTunnel is created between the client computing device and the server 130.

Following either operation 535 or 550, control passes to operation 560 and the application receives data in the listening socket generated by the AppTunnel. At operation 565 the data received in the AppTunnel is removed and passed to the process (i.e., the web browser) for further processing and presentation to a user via a suitable interface such as, e.g., a display. Operations 560-565 may be repeated until, at operation 570, there is no more data to tunnel, whereupon operations terminate.

Figure 6:
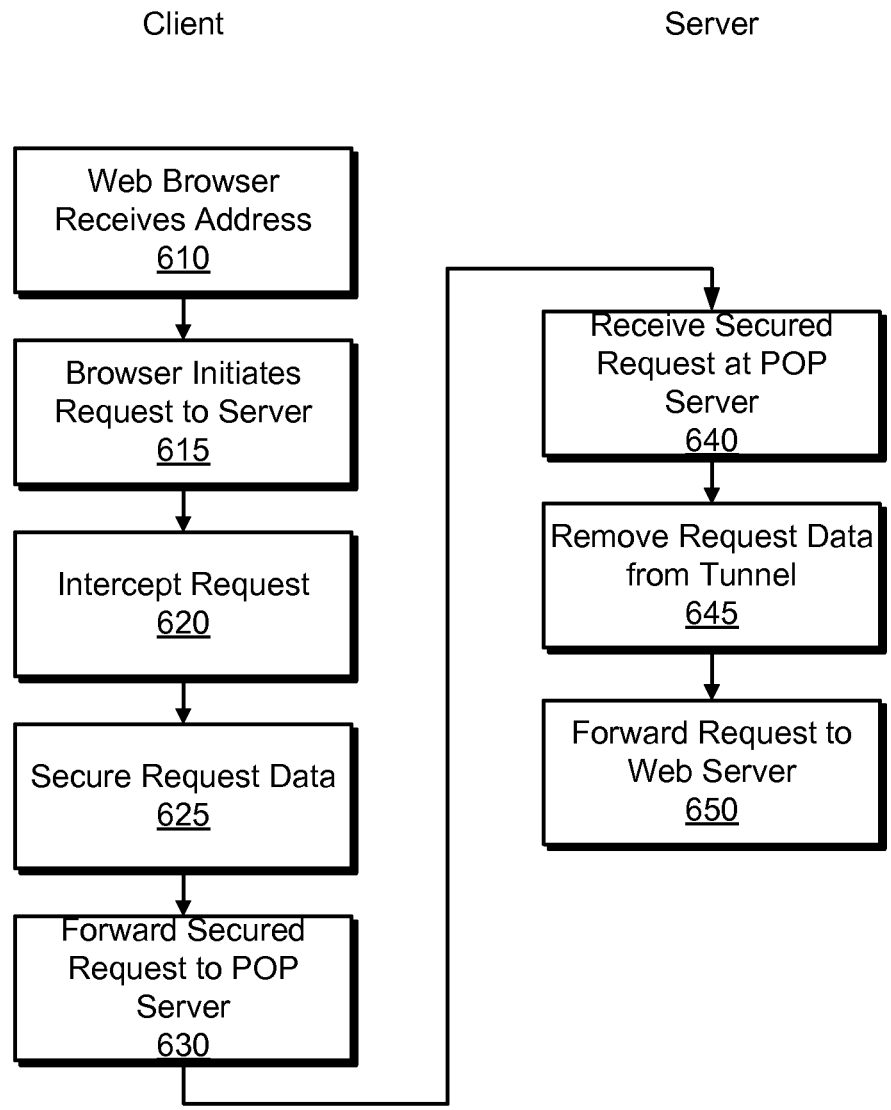

FIG. 6 is a flow diagram illustrating operations in a method for processing outbound traffic from a network interface module such as, for example, a web browser executing on a client computing device 110*a*, 110*b*, 110*c*. The operations of FIG. 6 depict traffic processing for a browser that has an AppTunnel module attached to the browser. Referring to FIG. 6, at operation 610 the web browser receives an address of a resource available on network 120. In one embodiment, the address may represent a Uniform Resource Locator (URL) of a resource available on network 120. At operation 615 the browser initiates a service request for the resource. At operation 620 the service request is intercepted by the AppTunnel module. At operation 625 the AppTunnel client secures the request data and at operation 630 the AppTunnel client forwards the request to the POP server 130. At operation 640 the secured request is received at the POP server 130. At operation 645 the secure tunnel module 264 (i.e., the AppTunnel server) extracts the request data from the secure tunnel.

At operation 650 the POP server forwards the service request to the address identified in the service request. In one embodiment, the service request is received in a first network interface module 262 instantiated on POP server 130, and POP server 130 instantiates a second network interface module 268 and launches a service request from the second network interface module.

Figure 7:
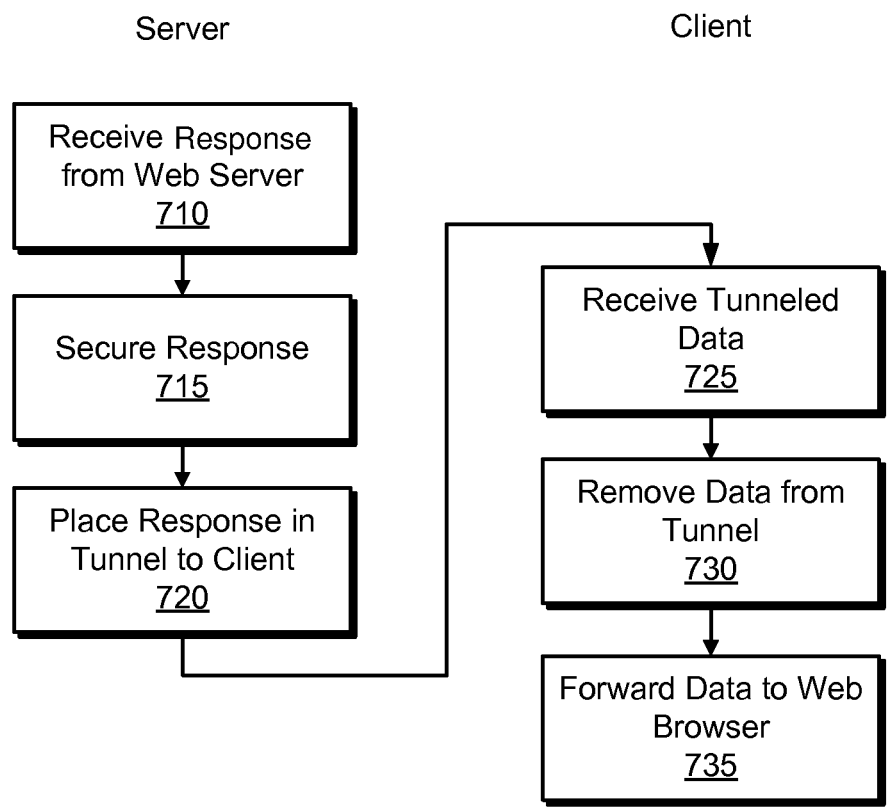

FIG. 7 is a flow diagram illustrating operations in a method for processing inbound traffic such as, for example, one or more resources returned from a service request. Referring briefly to FIG. 7, at operation 710 the data returned by the resource request is received at the POP server 130. In one embodiment, the data is received in the second network interface module 268 instantiated on the POP server 130. At operation 715 the response data is secured. In one embodiment, response data is operated on by the secure tunnel module 264. At operation 720 the response data is placed in the secure tunnel to the client computing device 110*a*, 110*b*, 110 *c* via the first network interface module 262.

At operation 725 the client receives the response data transmitted to the client by the server. At operation 730 the data is removed from the secure tunnel established by AppTunnels. In one embodiment, the AppTunnels client attached to the browser in the client computing device 110*a*, 110*b*, 110*c* removes the received data from the tunnel and, at operation 735, forwards the data to the web browser. The web browser may present the data on a user interface such as, e.g., a display, for viewing by the user.

Referring back to FIG. 4, if at operation 425 the client computing device is not capable of executing a plugin such as, e.g., an ActiveX control, then control passes to operation 465 and a URL rewriter technique is activated. URL rewriting is a method of providing a reverse proxy server for use in secure remote access systems and other applications without the need for any locally installed code. Most web browsers can exchange traffic with web servers using a protocol known as secure HTTP, or HTTPS. However, most websites do not support HTTPS. To add security to every website the user requests, special HTTPS requests are made to a URL rewriter server instead of the target web server, using HTTPS to the rewriter. The rewriter then forwards the request to the target web server by proxy, using the expected destination protocol of the web server (typically HTTP). On return, the web data is returned over HTTPS to the client's browser. It should be noted that any other form of browser-based security, or no security whatsoever, could be used in the communications link to the rewriter.

It should be noted that references to other web data will now cause the user's browser to make direct requests to the target server, rather than ask the rewriter server. Thus, references to other web content (hyperlinks, images, java applets, and so on) may be rewritten in the webpage so that they refer to the rewriter instead of to the target server to ensure that all web traffic is routed through the rewriter, and not via direct connections. Accordingly, any web references in the returned document are rewritten with references to the URL rewriter server.

Figure 8:
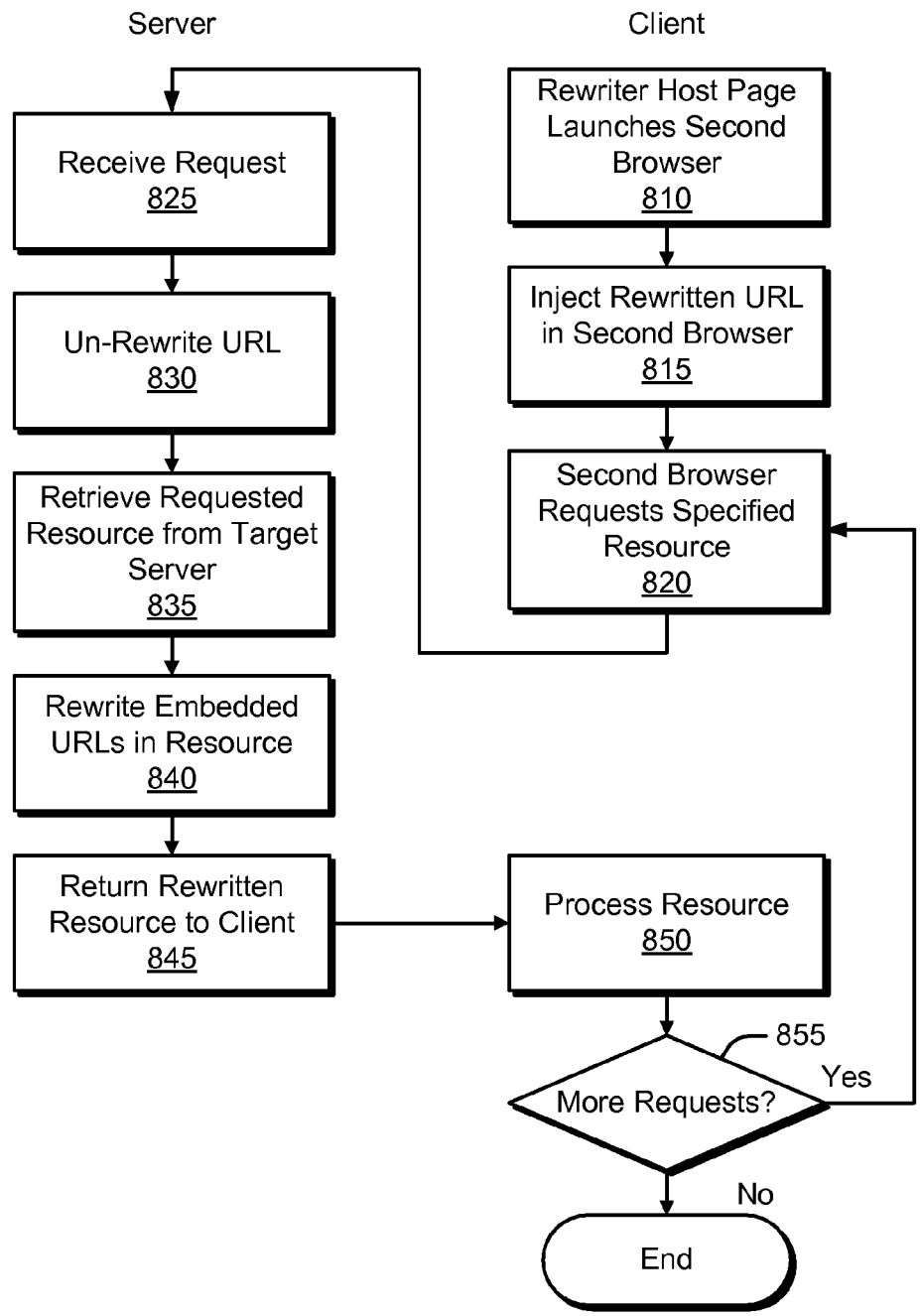

FIG. 8 is a flow diagram illustrating operations in a method for processing inbound traffic such as, for example, one or more resources returned from a service request. Referring briefly to FIG. 8 at operation 810 a rewriter host page on the client computing device 110*a*, 110*b*, 110*c* launches a second web browser using instructions embedded in the HTML and JavaScript code that is a part of the page. At operation 815 the rewritten URL is written into the second browser. At operation 820 the second browser requests the specified resource using the rewritten URLs.

At operation 825 the server 130 receives the service request from the client computing device 110*a*, 110*b*, 110*c*. At operation 830 the server 130 un-rewrites the URL, and at operation 835 the server retrieves the requested resource from the server 140, 142, 144 hosting the resource on the network 120. At operation 840 the server rewrites the embedded URLs in the retrieved resource, and at operation 845 the server returns the rewritten resource to the client.

At operation 850 the client computing device 110*a*, 110*b*, 110*c* receives and processes the requested resource. In one embodiment, processing the requested resource may include presenting the resource on a suitable display. If at operation 855 there are more requests to be processed, then control passes back to operation 820, and the browser requests the specified resource(s). By contrast, if at operation 855 there are no further resource requests, then the process terminates.

Thus, the operations described in FIGS. 3-8 enable a client device such as one or more of client computing devices 110*a*, 110*b*, 110*c* to establish a secure "last mile" communication link, thereby enabling secure communication with resources hosted by one or more servers 140, 142, 144 in a network 120. The systems and methods described herein are agnostic regarding the type of encryption applied (if any) to communication links between POP server 130 and servers 140, 142, 144.

The systems described above are browser-based systems. In alternate embodiments, a client computing device 110*a*, 110*b*, 110*c* may download and install a permanent piece of client encryption module onto the end user's computer. The permanent client provides encryption services between the client computing device 110*a*, 110*b*, 110*c* and the servers 140, 142, 144. With a permanent client encryption module, the end user does not have to navigate to the service provider's website in order to turn on secure surfing. Further, a client-based approach can support all Internet-based applications.

In another embodiment, an ActiveX control installs and initializes a virtual VPN Miniport, as described in U.S. patent application Ser. No. 10/737,200. The ActiveX control captures and processes any relevant traffic on the computer. In this way, end user traffic is directed into the secured tunnel described above.

A virtual VPN Miniport can support non-TCP protocols, while maintaining the convenience of a web-based environment. It can also secure applications that have already been started. For example, if the end user were running an instant messaging client, that client's communications would be secured from the time of connection forward, without a need to re-launch the client. Installation of a VPN driver can be silent and automatic, and only needs to occur one time. From that point on, the ActiveX control activates the VPN driver and manages network routes to cause traffic to be directed into the VPN driver for encryption.

Access to the POP server 130 may be provided by a number of methodologies. In one embodiment access to POP server 130 may be provided on a pay-for-service business model. In this embodiment, POP server 130 may include a transaction processing module to process payment transactions, e.g., by a credit card or other payment mechanism. Charges may be levied on the basis of bandwidth consumed, or by a time parameter (i.e., minutes, hours, days, years, etc.).

In alternate embodiments access to server 130 may be implemented on the basis of advertising revenue. For example, pay-per-click advertising can be implemented, using randomly-selected advertisements, pay-per-click advertising can be implemented, using information gained by inspecting the user's traffic during secure surfing to select targeted advertisements, or traditional Internet banner advertisements can be inserted, either randomly or based on inspection of the secured data. Advertisements can be inserted in the initial service provider web page, in the refreshed web page that hosts the ActiveX control, or even inline with the displayed web pages.

Multiple levels of service may be defined. For example, low-quality service might be provided free of charge, while high-quality service might be provided for a fee. Service levels may be differentiated by one or more facts such as, for example throughput (i.e., a performance aspect might be controlled), bandwidth (i.e., the total number of bytes transferred might be capped), data transfer (i.e., a transfer cap might be imposed per day, per month, or per year), or some combination thereof. Other options include allowing only a limited amount of time to use the system or bandwidth in a tier or a certain amount of throughput for a certain amount of time, with decreased throughput after the elapse of that time, or restricting access to certain resources based on the service level.

Last-mile encryption service may be provided to a user with no pre-existing account. The web-based interface can be used simply by entering the address of a website that is to be securely accessed. In the installed client case, the user logs in anonymously using the supplied anonymous login method. Anonymous users may be granted a different tier of service, as described above.

In an anonymous user case, cookie-based, form-based, or IP address-based information may be used to correlate the anonymous user's browsing activities, for purposes including providing advanced service features (such as browsing history, enhanced status reporting, etc), selecting relevant advertising, or for other purposes.

Users that desire temporary top-tier service may be given the option of paying electronically for a one-time use of the service without creating an account.

Users that wish to use the service repeatedly may wish to create a user account. The user account could then be used to track browsing history, make more intelligent decisions about advertising content to be presented, or offer other value-added services. Users of the service would then be prompted to log in to the website (or to the downloaded client software) using the established authentication credentials. Optionally, a cookie-based login persistence mechanism can be supported, allowing the user to go for a period of time without the need to log in.

Multi-Factor Authentication

As described above, authentication remains a technical challenge in the information technology sector. Described herein are multifactor authentication techniques which may be used alone, or in combination with other security techniques described herein to provide secure access to resources in a computer network. Embodiments of multi-factor authentication techniques will be described in the context of a computer network similar to the network described in with reference to FIG. 1. It will be understood, however, that authentication techniques as described herein may be implemented in a wide variety of computer networks.

Figure 9:
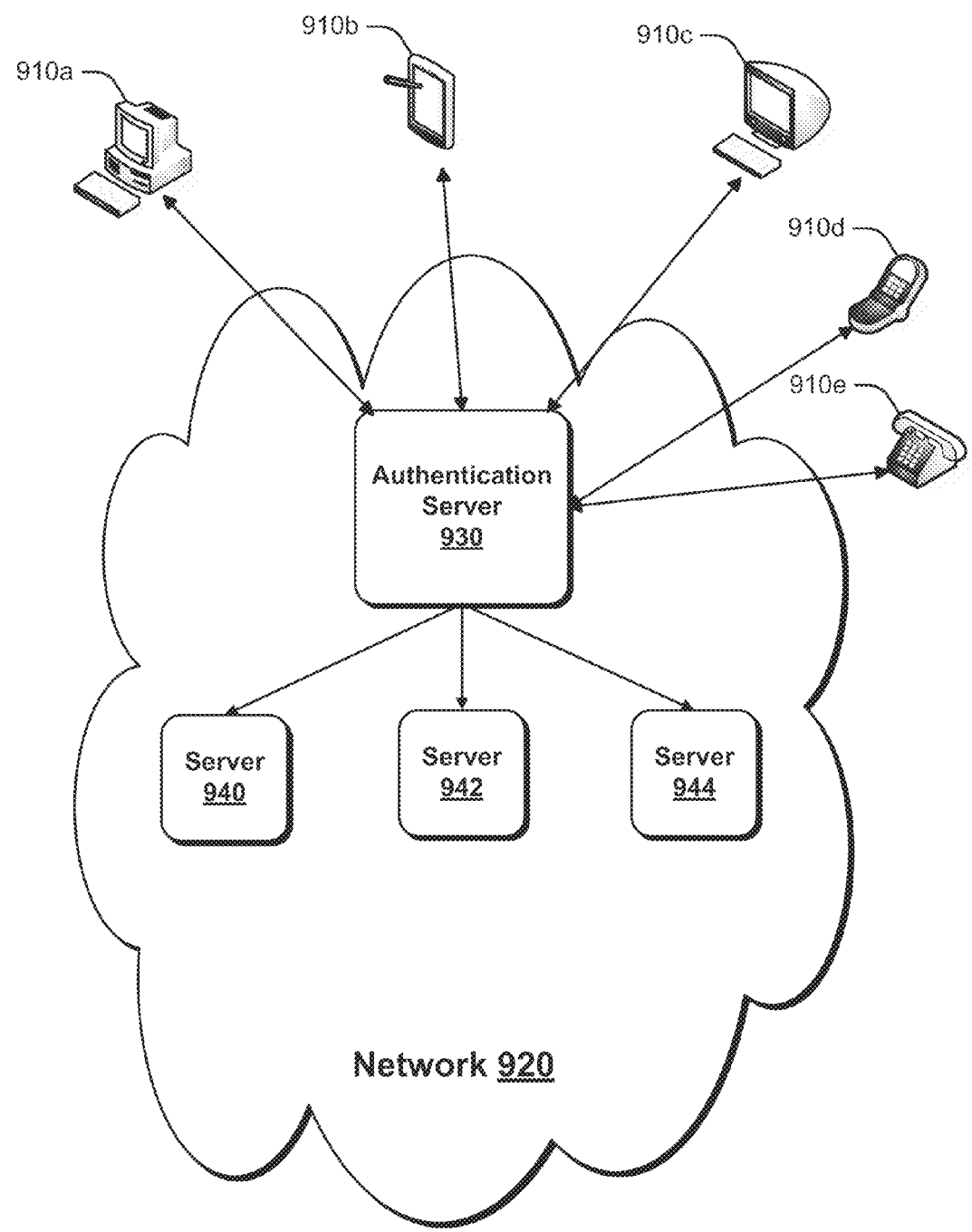
FIG. 9 is a schematic illustration of a networked computing environment in accordance with an embodiment

FIG. 9 is a schematic illustration of a networked computing environment in accordance with an embodiment. In the exemplary architecture depicted in FIG. 9, one or more client computing devices 910*a*, 910*b*, 910*c*, 910*d*, 910*e* establish a communication connection with an authentication server 930, which in turn communicates with one or more target servers 940, 942, 944 via a network 920. Target servers 940, 942, 944, in turn, provide access to one or more computing resources such, as, e.g., internet services, electronic mail services, data transfer services, and the like.

Client computing devices 910*a*, 910*b*, 910*c*, 910*d*, 910*e* may be any computer-based communication device, including a personal computer 910*a*, a personal digital assistant (PDA) 910*b*, a terminal device 910*c*, a mobile telephone 910*d*, or a land-line telephone 910*e*. Client computing devices 910*a*, 910*b*, 910*c*, 910*d*, 910*e* establish a communication with authentication server 930 via a communication network, which may be the same network 920 or a separate communication network. The particular form of communication network is not important. Communication network may comprise one or more direct communication links (e.g., a dial-up connection) between respective remote access devices 910*a*, 910*b*, 910*c*, 910*d*, 910*e*. Alternatively, the communication network may comprise a private data network such as, e.g., an X.25 network, a local area network (LAN), a wide area network (WAN), or a public network such as, e.g., the Internet.

Authentication server 930 may be embodied as a computing device, substantially as described in with reference to FIG. 2, above. Referring briefly to FIG. 2, the computing device 200 and comprise one or more authentication modules 269 which may execute when as an application module and the memory 230 of the computing system 200. In some embodiments, the authentication module 269 and implemented logic instructions which, when executed by a processor such as the processor 222, cause the authentication module 269 to implement multifactor authentication procedures to manage access to one or more resources of the computer network 920, such as for example, resources provided by servers 940, 942, or 944.

In some embodiments, the authentication server 930 implements a first authentication process in response to an authentication request from a client computing device such as one of client computing devices 910a, 910b, 910c, 910d, 910e. If the first authentication process is successful, then the authentication server 930 originates a second authentication request to a client device such as one of client computing devices 910a, 910b, 910c, 910d, 910e. In some embodiments, the authentication request from the client is transmitted through a first communication channel and the second authentication request originated by the authentication server 930 is transmitted using a second communication channel, different from the first communication channel. The authentication server 930 may process the response to the second authentication request and allow or deny access to a resource based on the response. In some embodiments the first communication channel and the second communication channel may be across separate communication networks. For example, the first communication channel may be across the computer network, while the second communication channel may be across a telephone network.

Figure 10:
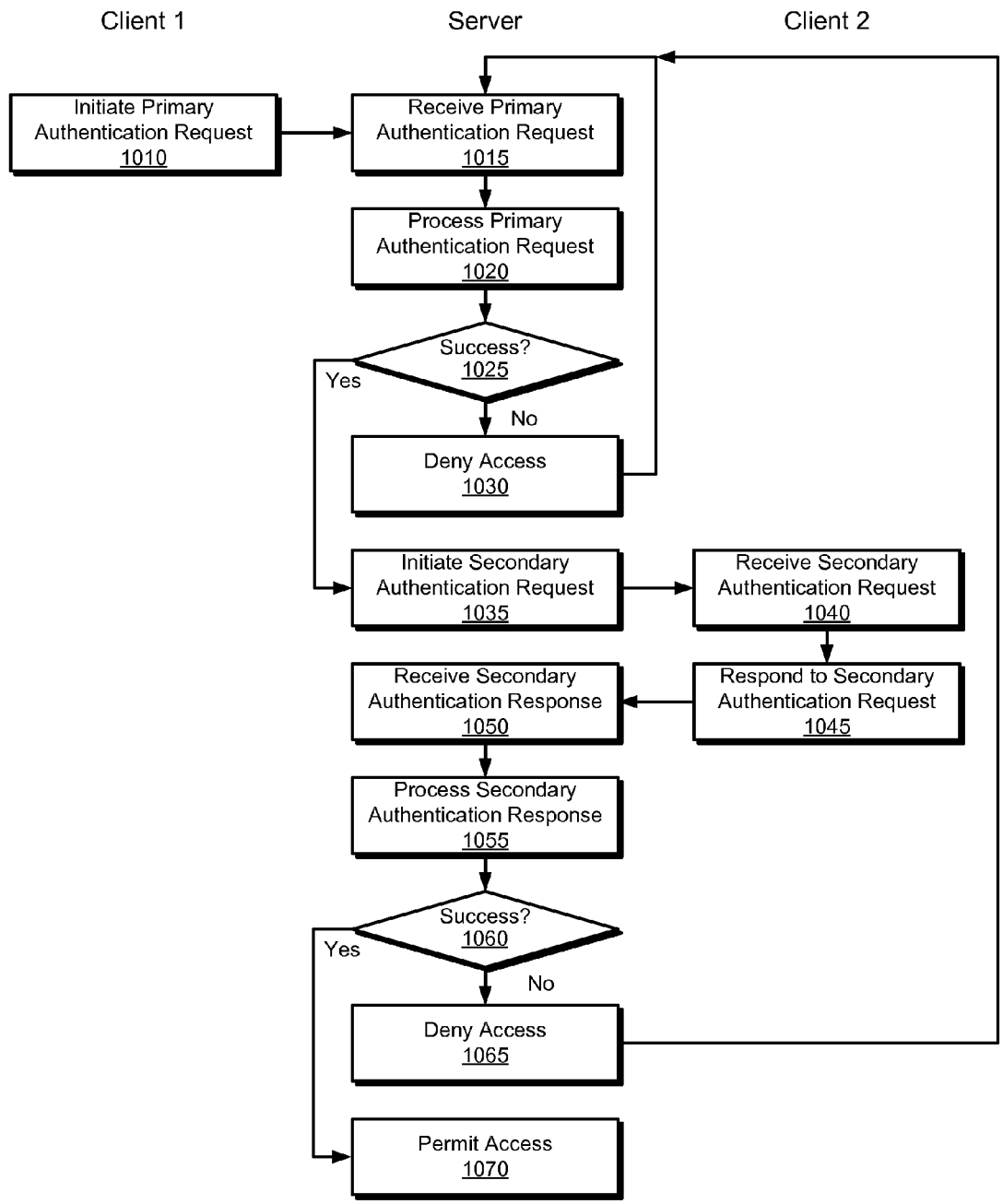
FIG. 10 is a flow diagram of embodiments of a method for multifactor authentication.

One embodiment of multifactor authentication will be explained with reference to FIG. 10, which is a flow diagram of embodiments of a method for multifactor authentication. Referring to FIG. 10, at operation 1010, a first client initiates a primary authentication request for access to a resource provided by computer network 920. In some embodiments, the primary authentication request may include a username and password combination associated with a user and/or a device from which the primary authentication request is originated. The primary authentication request may be transmitted to the authentication server 930 via a first communication channel.

At operation 1015, the authentication server 930 receives the primary authentication request, and at operation 1020 the authentication server 930 processes the primary authentication request. In some embodiments, the authentication server 930 performs a centralized authentication function which manages authentication to one or more resources and network 920. For example, authentication server 930 may maintain a data file comprising username and password combinations which may be associated with one or more resources of the computer network 920. FIG. 11 is a schematic illustration of a data file which may be used in a multifactor authentication. Referring briefly to FIG. 11, the illustrated data file 1100 includes a column for usernames, a column for passwords, and a column for approved resources. Usernames and passwords may be logically associated with the approved resource indicated in the table 1100. A single username may be associated with multiple passwords for different approved resources. In one embodiment, processing the primary authentication request may comprise searching the data file 1100 maintained by the authentication server for a username and password combination that corresponds to the username and password combination receipt in the primary authentication request.

If, at operation 1025, the primary authentication request is unsuccessful, i.e., if there is no corresponding username and password combination in the data table 1100, then the authentication server 930 denies the requestor access to network resource(s) 1030. In some embodiments, the authentication server 930 may transmit an error message to the requestor indicating that the username and password are invalid. Control then returns to operation 1015 and the authentication server 930 continues to monitor for another primary authentication request.

By contrast, if that operation 1025 primary authentication request is successful, i.e., if there is a corresponding username and password combination in the data table 1100, then control passes to operation 1035 and the authentication server 930 initiates a secondary authentication request. The secondary authentication request is transmitted from the authentication server 930 to the user via a second communication channel, different from the first communication channel. In some embodiments, the secondary authentication request is transmitted from the authentication server 930 to a second client in the user's possession. For example, the user may initiate the primary authentication request from a computing device such as a desktop computer or laptop computer and the authentication server 930 may transmit the secondary authentication request by initiating a telephone call to a telephone registered to the user. Referring briefly again to FIG. 11, a user may register, via a suitable user interface, a contact number to which the secondary authentication request may be transmitted from the authentication server 930. In response to a successful primary authentication request, the authentication server 930 may initiate a call to contact number indicated in the data table 1100. It should be noted that a user may provide different contact numbers for different resources.

At operation 1040 the secondary authentication request is received at the second client. The secondary authentication request may comprise a voice message which makes a request for information to authenticate the user. In some embodiments, the system may allow a user to prerecord a customized secondary authentication request in the user's own voice. For example, the user may record a message requesting a specific sequence of keystrokes or requesting the user to speak to a specific word or group of words. Having a user recorded message in the second authentication request helps to authenticate the system to the user, thereby eliminating or at least reducing the likelihood of a "man in the middle" attack on the system. In alternate embodiments, rather than using a prerecorded message in the user's voice, a user may select one or more tokens to be presented with a secondary authentication requests. For example, a token may include a predetermined word or character or numeric sequence selected by the user.

At operation 1045 the user responds to the secondary authentication request initiated by the authentication server 930. For example, in some embodiments the user may respond by pressing a predetermined sequence of keystrokes on a telephone keypad, or by pressing the pound key or the star key. In alternate embodiments the user may respond by speaking a predetermined word or series of words. In alternate embodiments the user need not provide an affirmative response; simply answering the telephone call may suffice as a response.

In some embodiments, the secondary authentication request initiated by the authentication server 930 may be implemented as a text message rather than a telephone call. Accordingly, the response to the secondary authentication request may also be implemented as a text message in which the user transmits a predetermined character or series of characters back to the authentication server 930.

In alternate embodiments, the secondary authentication request may require a user to initiate a call back in order to authenticate the user. For example, the secondary authentication request may transmit a text message or a voice call requesting the user to call back to the system to authenticate the user. In some embodiments, a return phone number may be included with the secondary authentication request, while in other embodiments a user may be required to call a predetermined phone number. As described above, the user may be required to provide one or more codes in the secondary authentication response.

At operation 1050 the authentication server 930 receives the response to the secondary authentication request, and at operation 1055 the authentication server 930 processes the response. In some embodiments, authentication server 930 maintains authentication codes which represent the anticipated response to the secondary authentication request in the data table 1100. The response to the secondary authentication request received from the user may be compared with the authentication code stored in the data table 1100 in order to determine whether the user is authentic.

If, at operation 1060, the response to the secondary authentication request fails to successfully authenticate the user then access to network resources is denied at operation 1065 and control passes back to operation 1015 in the authentication server monitors for additional incoming primary authentication requests. In some embodiments, the authentication server 930 may implement an error routine in response to a failed a secondary authentication request. The authentication routine may transmit an error message to the user via the first communication channel, the second communication channel, or both. The error message may instruct the user that authentication has failed and they provide the user with an opportunity to restart the authentication process.

By contrast, if that operation 1060 the response to the secondary authentication request successfully authenticates the user then control passes to operation 1070 and the user is granted access to the network resource or resources associated with the username and password in the data table 1100. Control then passes back to operation 1015 and the authentication server 930 continues to monitor for additional primary authentication request.

Thus, the operations depicted in FIG. 10 enable the network infrastructure depicted in FIG. 11 to implement a multifactor authentication process. In some embodiments described herein, the multifactor authentication process utilizes two separate network devices, i.e., a computing device and a telephone. In some embodiments, the multifactor authentication process may utilize a single network device, i.e., a computing device, which executes two or more logical network devices. For example, a user may initiate a primary authentication request from a first application executing on the computing device, and the second authentication request may be directed to a second application executing on the computing device. For example, the second application may be an Internet Protocol (IP) telephony application.

Various features may be added to the functionality of the basic authentication process described herein. In some embodiments, the authentication server 930 may store in a memory module such as cache memory the results of a primary authentication request initiated by a user, alone or in combination with the results of a secondary authentication response provided by the user. The results may be stored in for a predetermined period of time or for a dynamic period of time. Thus, when a user has successfully authenticated himself or herself to the system additional authentication may not be required during the time period. The authentication server 930 may require that subsequent primary authentication requests be initiated from the same network address in order to bypass the secondary authentication request. Thus, in some embodiments the authentication server 930 may detect the network address from which the primary authentication request is initiated and may store the network address in a memory module.

Further, there may be circumstances in which secondary authentication requests may not be necessary. For example, if a user is located on a trusted network in the secondary authentication request may be bypassed. Thus, in some embodiments of the authentication server 930 may detect the network address from which the primary authentication request is initiated and may compare the network address with a list of approved network addresses stored in a memory module.

Still further, there may be circumstances in which the authentication server 930 declines to initiate a secondary authentication requests. In some embodiments, in the event of a predetermined number of failures for a primary authentication request the authentication server 930 may flag a user as a suspect for fraudulent access and may decline to initiate a secondary authentication request unless further conditions are met. In some embodiments, in the event multiple primary authentication requests are received from different network addresses within a predetermined period of time the authentication server may flag a user as a suspect for fraudulent access and may decline to initiate a secondary authentication request unless further conditions are met. For example, a user may be required to reset passwords or to speak personally with an administrator.

In some embodiments, the authentication server 930 may provide a user interface that enables users to register one or more telephone numbers or contact addresses for the network device intended for use for the secondary authentication request. The user interface may further permit users to select one or more authentication codes or personal identification numbers (PINs) for both the primary authentication request and the secondary authentication response.

Various alternate embodiments may be implemented. For example, in some situations it may not be possible to submit a user's primary authentication credentials to the authentication server without incurring unwanted side-effects. For example, logging into a web application using primary authentication credentials may cause the application to take actions such as creating a user session, logging a message, or the like that may be undesirable.

In such situations, a the authentication server may implement a pre-authentication process. After receiving the primary authentication credentials, the authentication system can attempt to pre-authenticate them using a different API interface, rather than pre-authenticating to the target server itself. For example, in a web application such as Microsoft's Outlook Web Access, the system may pre-authenticate the user by calling the Windows LogonUser( ) API, which checks the user's username and password against the Windows password database. Alternatively, in a Citrix environment, the system could pre-authenticate the user using the Citrix authentication APIs.

If the pre-authentication step is successful, the secondary authentication may be implemented as described before. Only if that is also successful are the user's credentials submitted to the application in question for final log-in. This becomes a three-phase login, but it has the benefit of allowing compatibility with applications that would not otherwise support the two-phase approach.

In addition, the strength of the authentication process can be increased using voice-print technology during the confirmation call. During the secondary authentication call, the system asks the user to repeat a series of words. The user repeats the words, and the system makes a determination of whether the user is who he claims to be by evaluating the user's voice against a voice database, using voice matching algorithms.

Again, this makes the system three-factor: the primary authentication is something the user knows, the secondary is something the user has (phone), and the tertiary authentication is something the user is (his voice).

This system can also be used for multi-person authentication. For example, in situations which require the approval of more than one to allow an action to complete, multiple secondary authentication calls can be placed. For example, in the case of a bank transfer requiring two people to agree to the transaction, the system may place multiple confirmation calls, one to every person authorized to approve the transaction. It could then play back details of the proposed transaction to each user (which can happen simultaneously), and if a minimum number of those users confirm the transaction, the system returns success. This system can scale to an arbitrarily large number of required confirmations.

Enhanced Multi-Factor Event Confirmation System

Security-related events occur continuously on a day-to-day basis. Security events include authentications to secure computer systems, financial transactions through a bank or brokerage, or particular line-of-business events such as the submission of source code to a source control system or the accessing of a patient's medical records. These events provide an opportunity for fraud, both on an individual and on a bulk scale, and consequently, securing these events is of the greatest importance.

Existing event confirmation systems typically rely on a single authentication factor being presented by the person triggering the event. For example, login to a company's remote access system is typically secured using a username and a password assigned to the user logging in. Or, in the case of a credit card transaction, the card number (which is, essentially, a secret known only to the cardholder) is presented, along with the associated expiration date and sometimes a signature.

Each of these existing single-factor systems carries with it the implicit weakness associated with the single factor in question: secrets can be lost or stolen, cards can be cloned, and so on. Introducing a second factor into the verification process can significantly increase the security of event confirmations. The PhoneFactor system provides such a second factor.

PhoneFactor operates by placing a telephone call over the public telephone network to a user's pre-registered phone number (or one of several pre-registered phone numbers). The phone call includes any relevant details of the event in question and prompts the user to confirm the event. The user confirms the event by entering a series of digits and/or symbols using the phone's keypad.

Generally:
1) User initiates an event
2) PhoneFactor verifies any required business rules (correct username/password, for example)
3) If successful—PhoneFactor places a call to the user's pre-registered phone number
  a. If successful—PhoneFactor plays back event data to the user and prompts the user to confirm the event
  b. If the data match the user's expectations, the user confirms the event by entering a pre-arranged set of keystrokes
4) If a failure occurs at any point during the above procedure, the event is deemed not to be confirmed.

The out-of-band nature of PhoneFactor dramatically complicates the attacker's job, since he now must successfully subvert two entirely different networks based on two entirely different technologies.

For example, one event type is login to a computer network through a remote access system. After the user's username and password are entered and confirmed, PhoneFactor generates a phone call to a pre-registered phone number including relevant details of the event, such as the geographic location from which the login is being attempted. If the information provided by the PhoneFactor phone call matches the user's expectations, the user enters a pre-registered sequence of keypresses into the phone, confirming the event.

Another example is in the realm of online banking. Say, for example, a bank customer initiates a wire transfer for $1,000 to an account ending in 1111. The PhoneFactor system makes a phone call to the user's registered phone number and reads off this information. If the information matches the user's expectations, the user confirms the event in the usual way.

Another example of event confirmation is in the area of healthcare. A healthcare worker may log into a medical records system, triggering a login event confirmation similar to the one described above. Later in the session, the user may add a prescription to the patient's record, prompting an additional event confirmation. In this way, multiple event confirmations can be mixed and matched, allowing implementers of the technology to make tailored decisions about which events benefit from confirmation in which circumstances.

PhoneFactor can add event confirmations to a variety of existing systems in a variety of circumstances. One kind of integration involves the use of third-party fraud scoring systems. These systems evaluate a group of factors, such as time of day, network addressing information, and so on, to determine if the transaction taking place is likely to be legitimate or fraudulent, and if it is suspected to be the latter, an event confirmation using PhoneFactor can be initiated.

There are several cases in which the user would refuse to confirm the event, or even signal a fraud alert. One such case is if the user receives a phone call that was not expected—for example, the user is driving down the road, nowhere near a computer, and the phone rings. The user would refuse to confirm the event because he did not trigger it.

Fraud alerts can be sent in real-time at the request of the user to alert the appropriate company representatives or authorities that a fraudulent event has been triggered. This kind of "hot lead" may improve investigators' chances at locating the fraudster.

The PhoneFactor event confirmation system may be implemented as follows. Administrators of the system to be protected define in advance a variety of events for which confirmation is desired. These events are configured using a computer-based confirmation interface that allows the user to create an appropriate event template, consisting of:

One or more pre-recorded outgoing messages to the user, selected from a chosen message set (perhaps per-language, per-region, etc.)
  Zero or more digit strings, which are rendered in spoken language during the event confirmation call using pre-recorded numerical recordings, selected from a language number set
  Zero or more text-to-speech fields, rendered in the user's selected language
  The order in which these elements are to appear in the outgoing PhoneFactor message is supplied Pre-recorded static messages may also be included in the outgoing message, for purposes such as marketing or user information.

Event templates may be customized on a per-language, per-region, or other basis. These message sets contain one message for each requirement in the event template. For example, administrators may define an English message set and a Spanish message set. During submission of the PhoneFactor request, the submitter requests a specific message set, and messages from that message set are chosen to be played in the outgoing PhoneFactor message.

The combination of event templates, message sets, and the specified response keystroke sequence allows for a variety of implementation alternatives. For example, the user could be prompted using the Wire Transfer template, with the English message set, and the confirmation code could be the last four digits of the user's bank account number.

PhoneFactor event confirmation can be applied to a wide variety of problem spaces and contexts, and can play an important role in fraud prevention when dealing with sensitive events and information.

Reference in the specification to "one embodiment" or "an embodiment" means that a particular feature, structure, or characteristic described in connection with that embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method for confirming events initiated by a user, the method comprising:
  receiving an indication of the user initiating an event via a first device;
  based at least on receiving the indication of the user initiating the event via the first device, initiating a telephone call or sending a text message over a communications network to a pre-registered number associated with a second device of the user, the pre-registered number having been registered before the user initiated event;
  sending, over the communications network, an outgoing message to the user's second device, the outgoing message comprising replayed event data information specific to the user initiated event, the replayed event data information comprising 1) information describing the user initiated event and 2) information identifying the user initiated event;
  receiving, over the communications network, a response to the outgoing message, the response being generated from the user's second device;
  determining whether the response from the user's second device matches pre-selected authentication information, the pre-selected authentication information having been pre-selected before the user initiated event is initiated; and
  based at least on determining that the response from the user's second device matches the pre-selected authentication information, confirming the user initiated event, otherwise not confirming the user initiated event, wherein, upon a condition in which the user initiated event is not confirmed, a first error message is transmitted to the first device and a second error message is transmitted to the second device, whereby the first device, which was used to initiate the event, receives the first error message and the second device, which was used to respond to the outgoing message, receives the second error message, and wherein at least one of the first error message or the second error message provides the user with an opportunity to reinitiate the event.

2. The method of claim 1, wherein the outgoing message includes information specific to a geographic location from where the user initiated event was initiated.

3. The method of claim 1, wherein the user initiated event is associated with a financial transaction.

4. The method of claim 3, wherein the outgoing message includes a monetary amount of the financial transaction.

5. The method of claim 3, wherein the outgoing message includes an account information of one or more accounts involved in the financial transaction.

6. The method of claim 1, wherein the response from the user's second device includes a sequence of one or more keystrokes of digits or symbols entered on the user's second device.

7. The method of claim 1, wherein the outgoing message is selected from one or more event templates, wherein the event templates include at least one of the following:
  (a) one or more pre-recorded spoken language messages;
  (b) one or more digit strings rendered in spoken language; and
  (c) one or more text strings rendered in spoken language.

8. The method of claim 1, wherein the outgoing message includes a pre-recorded static message.

9. The method of claim 1, wherein the replayed event data information included within the outgoing message is a prerecorded, customized voice message in the user's own voice.

10. The method of claim 1, wherein the pre-selected authentication information, which was pre-selected before the user initiated event, requires the user to initiate a call back to authenticate the user, whereby, to be considered authenticated, the user is required to call a determined number.

11. A computer-readable hardware storage medium with an executable program stored thereon for confirming events initiated by a user, wherein the program instructs at least one computer to:
  receive an indication of the user initiating an event via a client device;
  based at least on receiving the indication of the user initiating the event via the client device, initiating a telephone call or sending a text message over a communications network to a pre-registered number associated with a telecommunications device of the user, the pre-registered number having been registered before the user initiated event;

send, over the communications network, an outgoing message to the user's telecommunications device, the outgoing message comprising replayed event data information specific to the event, the replayed event data information comprising 1) information describing the event and 2) information identifying the event;

receive, over the communications network, a response to the outgoing message, the response being generated from the user's telecommunications device;

determine whether the response from the user's telecommunications device matches pre-selected authentication information, the pre-selected authentication information having been pre-selected before the event is initiated; and based at least on determining that the response from the user's telecommunications device matches the pre-selected authentication information, confirming the event, otherwise not confirming the event, wherein, upon a condition in which the event is not confirmed, a first error message is transmitted to the client device and a second error message is transmitted to the telecommunications device, whereby the client device, which was used to initiate the event, receives the first error message and the telecommunications device, which was used to respond to the outgoing message, receives the second error message, and wherein at least one of the first error message or the second error message provides the user with an opportunity to reinitiate the event.

12. The computer-readable hardware storage medium of claim 11, wherein the outgoing message includes information specific to a geographic location from where the event was initiated.

13. The computer-readable hardware storage medium of claim 11, wherein the event is associated with a financial transaction.

14. The computer-readable hardware storage medium of claim 13, wherein the outgoing message includes a monetary amount of the financial transaction.

15. The computer-readable hardware storage medium of claim 13, wherein the outgoing message includes an account information of one or more accounts involved in the financial transaction.

16. The computer-readable hardware storage medium of claim 11, wherein the response from the user's telecommunications device includes a sequence of one or more keystrokes of digits or symbols entered on the user's telecommunications device.

17. The computer-readable hardware storage medium of claim 11, wherein the outgoing message is selected from one or more event templates, wherein the event templates include at least one of the following:
  (a) one or more pre-recorded spoken language messages;
  (b) one or more digit strings rendered in spoken language; and
  (c) one or more text strings rendered in spoken language.

18. The computer-readable hardware storage medium of claim 11, wherein the outgoing message includes a pre-recorded static message.

19. A method comprising:
receiving an indication associated with a user-initiated event, the indication being transmitted via a first device of a user that initiated the user-initiated event;

based at least on receiving the indication from the first device, sending a communication over a communication network to a telecommunications device that is known, prior to receiving the indication, to be associated with the user, the communication comprising first information, the first information being associated with the user-initiated event, the first information also describing at least a portion of the user-initiated event;

receiving, over the communications network and from the telecommunications device, a response to the communication, the response including second information;

determining whether the second information matches pre-selected authentication information, the pre-selected authentication information having been selected prior to receiving the indication; and based at least on determining that the second information matches the pre-selected authentication information, confirming the user-initiated event, otherwise, not confirming the user-initiated event, wherein, upon a condition in which the user-initiated event is not confirmed, a first error message is transmitted to the first device and a second error message is transmitted to the telecommunications device, whereby the first device, which was used to initiate the user-initiated event, receives the first error message and the telecommunications device, which was used to respond to the communication, receives the second error message, and wherein at least one of the first error message or the second error message provides the user with an opportunity to reinitiate the user-initiated event.

20. The method of claim 19, wherein the telecommunications device is a device associated with a single user, the single user being authorized to approve the user-initiated event.

21. A system for providing enhanced secondary authentication, the system comprising:
an authentication server having at least one processor and at least one memory device, the authentication server configured to:
  receive a user initiated event from a device of a user;
  identify first information that is associated with the user initiated event, the first information also describing at least a portion of the user initiated event;
  identify a telecommunications device that is also associated with the user, wherein the user is authorized to approve the user initiated event via the telecommunications device;
  send, over a communications network, a first communication to the telecommunications device, the first communication including the first information;
  receive, from the telecommunications device, a second communication, the second communication including second information, the second information having pre-selected authentication information therein, wherein the pre-selected authentication information is information selected prior to receiving the user initiated event;
  determine whether the second information matches the pre-selected authentication information; and
  confirm the user initiated event when the second information matches the pre-selected authentication information, otherwise, deny the user initiated event, wherein, upon a condition in which the user initiated event is denied, a first error message is transmitted to the device and a second error message is transmitted to the telecommunications device, whereby the device, which was used to initiate the event, receives the first error message and the telecommunications device, which was used to respond to the first communication, receives the second error message, and wherein at least one of the first error message or the second error message provides the user with an opportunity to reinitiate the event.

22. The system of claim 21, wherein, when the user initiated event is confirmed, the first information and the second information are stored in a memory cached for a predetermined period of time, and wherein the authentication server is further configured to:

detect a second user initiated event by the user;
  detect that the predetermined period of time has not yet elapsed; and
  confirm the second user initiated event without requiring the user to present additional authentication information.

\* \* \* \* \*